Dec. 19, 1961 H. MULCH ET AL 3,013,469
SLIDE PROJECTOR
Filed Oct. 24, 1958 3 Sheets-Sheet 1

INVENTORS
HANS MULCH
MANFRED RIECKE
By Toulmin & Toulmin
Attorneys

Dec. 19, 1961   H. MULCH ET AL   3,013,469
SLIDE PROJECTOR
Filed Oct. 24, 1958   3 Sheets-Sheet 2
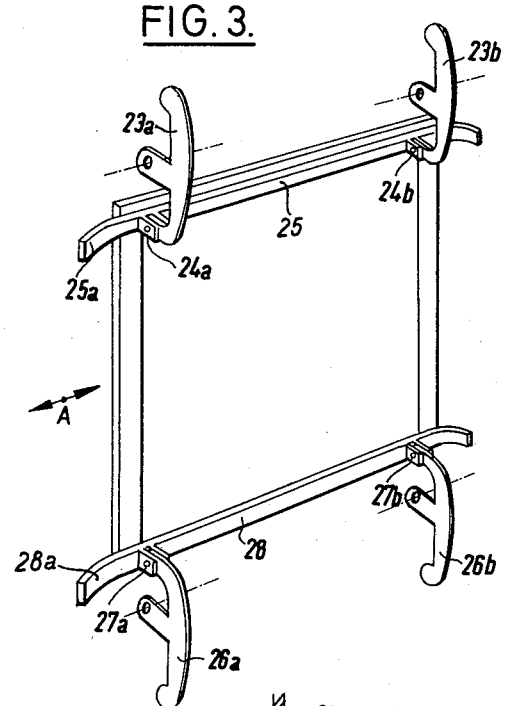
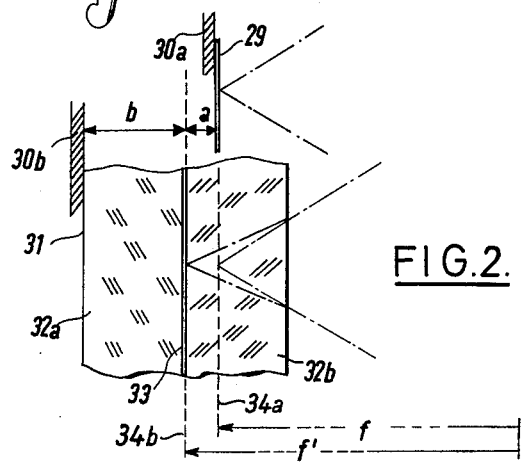
INVENTORS
HANS MULCH
MANFRED RIECKE
By Toulmin & Toulmin
Attorneys

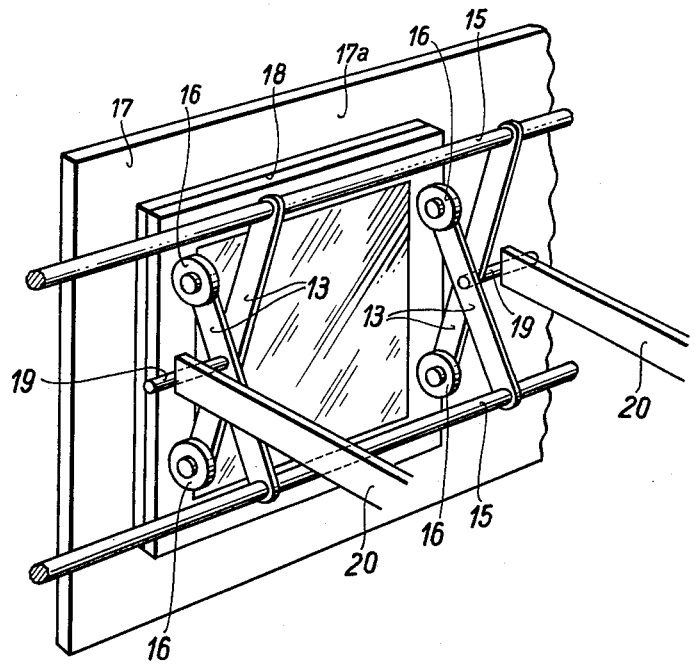

ns Mulch, Wetzlar, and Manfred Riecke, Nauborn, near Wetzlar, Germany, assignors to Ernst Leitz G.m.b.H., Wetzlar (Lahn), Germany
Filed Oct. 24, 1958, Ser. No. 769,400
Claims priority, application Germany Oct. 25, 1957
9 Claims. (Cl. 88—26)

The present invention relates to slide projectors.

More particularly, the present invention relates to a slide projector which is self-focussing.

There exist a large variety of diapositives, commonly called slides, which are film strips or other transparencies that are either mounted on cardboard frames or are sandwiched between two layers of glass or other transparent material. Since these layers of glass are not of uniform thickness, there arises the necessity of re-focussing the projector whenever a slide the glass layers of which are different thicknesses than the glass layers of the previous slide, is inserted into the projector. This necessity is due to two factors: (1) a slide is usually received by the projector in such a manner that at least one side of the slide lies upon a certain abutment surface, so that the pictures or transparencies of slides having glass layers of different thicknesses will be located in different picture planes, depending upon the thickness of the layer of glass between the picture proper and the abutment surface, and (2) the presence of glass layers in the light beam causes a shifting of the focal plane of the objective due to the different indices of refraction of glass and air.

There exist self-focussing slide projectors which allow for the first-mentioned of the above factors, such as projectors of the type shown in United States Patent 2,298,413, but in such projectors no allowance is made for the second of the above-mentioned factors.

It is therefore an object of the present invention to provide a self-focussing slide projector which overcomes the above disadvantages.

It is another object of the present invention to provide a self-focussing slide projector which is capable of accommodating any one of a number of different types of slides, including slides composed of a transparency sandwiched between two layers of glass, which slides may be of various thicknesses.

The objects of the present invention also include the provision of a self-focussing slide projector in which the index of refraction of the glass of a slide is taken into consideration and is automatically compensated for.

It is a still further object of the present invention to provide a slide projector which is capable of achieving the above advantages and which is at the same time of simple and rugged construction.

With the above objects in view, the present invention mainly consists in that improvement in a self-focussing slide projector which comprises a support, slide carrier means and objective means arranged on the support, at least one of which two means is movable in the direction of the optical axis of the objective means, and feeler means adapted to engage a slide carried by the slide carrier means and operatively connected to the movable means for moving the same in the above-mentioned direction to adjust the distance between the slide carrier means and the objective means as a function of the thickness of the slide, in particular, a distance which is unequal to but dependent upon the thickness of the slide.

Additional objects and advantages of the present invention will become apparent upon further consideration of the specification taken in conjunction with the accompanying drawings in which FIG. 1 is a fragmentary sectional view of a slide projector according to the present invention;

FIG. 2 is a schematic representation of the relative positions occupied by the slide carrier while carrying different types of slides;

FIG. 3 is a fragmentary perspective view of a modification of the embodiment shown in FIG. 1;

FIG. 5 is a fragmentary perspective view of the embodiment shown in FIG. 4;

Figure 1:
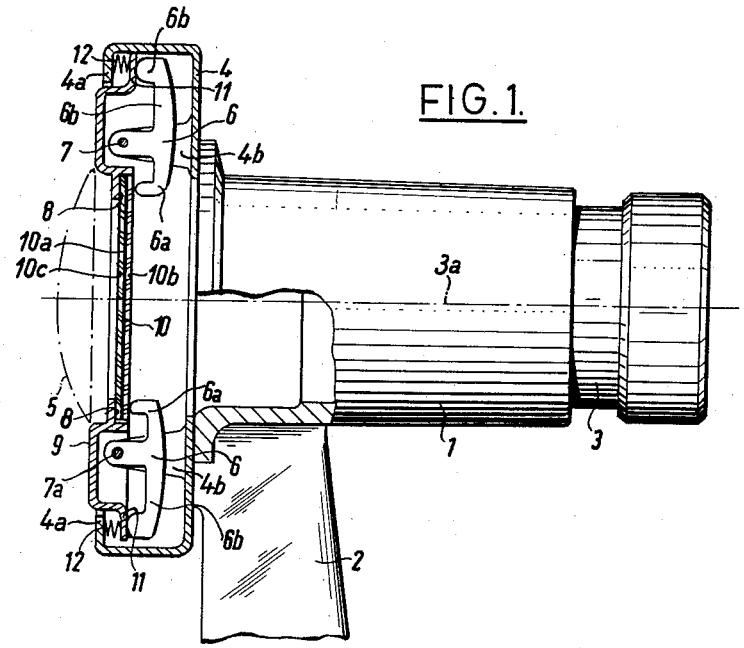

Referring now to the drawings, and to FIG. 1 thereof in particular, there is shown a slide projector incorporating a support 2 carrying a tube 1 at one end of which an objective means 3 is mounted, the latter being longitudinally adjustable in the direction of its optical axis 3a. Also mounted on the support 2 is a housing 4, the latter being arranged in front of the condenser lens 5, and a slide carrier 9 is arranged within the housing 4 in alignment with the optical axis 3a of the objective means 3. The slide carrier 9 is formed with a cut-out through which this optical axis 3a passes and the mounting of the slide carrier 9, as is more fully set forth below, is such that the carrier is movable toward and away from the objective means 3 in the direction of the optical axis 3a. That portion of the slide carrier 9 which is next to the cut-out is formed as an abutment surface 8, and this surface lies in a plane which is transverse to the optical axis.

The slide carrier is adapted to receive a slide 10 which may comprise a transparency 10a sandwiched between two layers of glass 10b and 10c, and the arrangement of the parts is such that when this slide is received by the slide carrier 9, one side of the slide lies against the abutment surface 8 so that light emanating from a light source (not shown) will pass through the condenser lens 5, the cut-out in the slide carrier 9, the slide 10, the tube 1 and the objective means 3.

The slide carrier is formed with two side flanges 11, the under-surfaces of which are engaged by compression springs 12 which abut against inwardly turned flanges 4a of the housing 4.

Cooperating with the slide carrier are suitable feeder means which are adapted to engage the slide 10 and which adjust the distance between slide carrier 9 and the objective means 3 as a function of the thickness of the slide. As will be more fully set forth below, this distance is unequal to but proportional or dependent upon the thickness of the slide. These feeler means comprise four levers 6, two of which are shown in FIG. 1. These levers are so arranged as to engage the slide in the regions of its four corners, and are pivoted about axles 7 and 7a which are mounted in support noses 4b which project inwardly into the housing 4. Each lever has two lever arms 6a and 6b of unequal lengths; the lever arm 6a of shorter length abuts against the free side of the slide 10, i.e., the side of the slide which is opposite to the side which abuts against the surface 8, and the lever arm 6b of greater length abuts against one of the flanges 11 of the slide carrier. With the pivot axis of each lever being spaced, in the direction of the slide carrier, from the line joining the point of contact between the lever arm 6b and the flange 11 and the point of contact between the lever arm 6a and the slide 10, the position of the slide carrier 9 will, upon insertion of a slide 10, automatically assume such a position along the optical axis 3a that the transparency 10a will lie in the focal plane of the objective means 3 and thus occupy the position necessary to ensure proper focussing.

Thanks to the above construction and arrangement not only differences in glass thickness but also the shifting of the focal plane, due to the different indices of refraction of glass and air, are compensated for. This is best illustrated in FIG. 2 which shows the relative positions occupied by the slide carrier while the same carries different types of slides. Thus, 30a shows the position of a slide carrier while the same carries a slide 29 which is simply a transparent sheet. This slide 29 lies in a focal plane 34a which is spaced a focal distance f from the objective (not shown in FIG. 2). 31b shows the position of the slide carrier while the same carries a slide 31 composed of a transparency 33 sandwiched between two layers of glass 32a and 32b. Due to the fact that the layer 32b, being made of glass, has a higher index of refraction than air, the focal plane will be moved away from the objective to the position 34b, and for this reason the transparency 33 of the slide 31 must occupy not the position 34a but the position 34b which is spaced from the objective a distance f', which exceeds the distance f by a. Therefore, it would not suffice if the slide carrier were to shift its position by a distance b, the latter being equal to one-half the total thickness of the slide which is substantially equal to the thickness of the layer 32a or 32b; instead, the new position 30b of the slide carrier must be spaced a plus b from its previous position 30a, and this is achieved in the embodiment shown in FIG. 1, thanks to the different lengths of the lever arms 6a and 6b. The ratio of the lengths of these arms is selected as a function of the index of refraction of that layer of glass which is on the objective side, i.e., layer 32b. It is this arrangement, also, which allows the slide projector according to the present invention to accommodate relatively very thin slides, in particular, slides wherein the transparency is not sandwiched between glass layers, inasmuch as when the thickness of the slide is small, the actual difference in length of the lever arms 6a and 6b will be substantially negligible, i.e., although the slide carrier will be moved a distance equal to a plus b, the same as if there were a glass layer to be compensated for, with thin slides the total of a plus b will be so small as to render negligible the distance a; it is only when the slide carrier receives a relatively thick slide, namely, a slide in which the transparency is sandwiched between two layers of glass, that the distance a becomes sufficiently significant to effect the desired correction.

It should also be noted that in the above-described arrangement no special attempt is made to compensate for differences in indices of refraction of different glasses, since it has been found that with the above construction these differences are negligible.

FIG. 3 is a fragmentary perspective view of an embodiment similar to that shown in FIG. 1, except that an elongated guide 25 is connected to those arms of the levers 23a and 23b which engage the slide, and that a second elongated guide 28 is connected to corresponding arms of the levers 26a and 26b. These guides, which are pivotally mounted to the respective levers at 24a, 24b and 27a, 27b, are formed at their ends with curved portions 25a, 28a, so as to facilitate the insertion of a slide in the direction indicated by arrow A.

Figure 4:
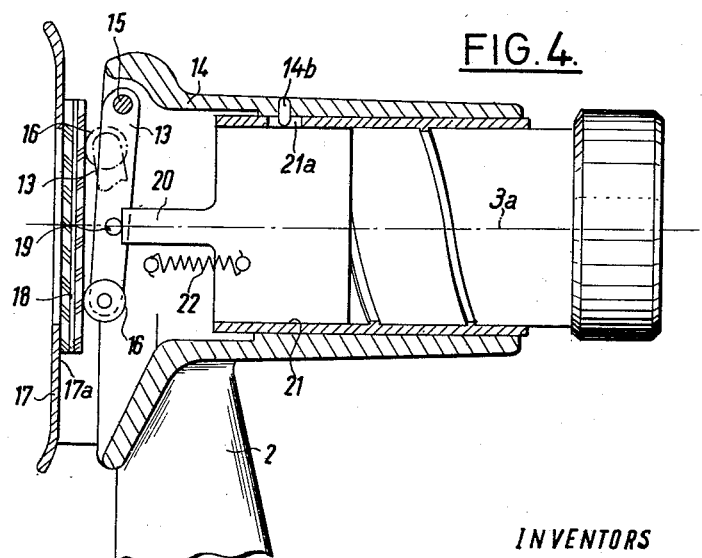
FIG. 4 is a fragmentary sectional view of another embodiment of a slide projector according to the present invention.

FIGS. 4 and 5 are sectional and perspective views, respectively, of an embodiment according to the present invention in which the feeler means are connected with the objective means rather than with the slide carrier. Thus, in this embodiment the support 2 carries a tube 14 within which the objective means 21 is mounted for axial sliding movement between limits controlled by a pin 14a which extends into a cut-out 21a of the objective means 21. The feeler means are in the form of four single-armed levers 13 which are mounted at one end for pivotal movement about axles 15 and which carry at their other ends rollers 16 adapted to engage a slide 17 while the latter lies against the abutment surface 17a of the slide carrier 17.

The levers 13 which are on the same side carry a pin 19 against which is pressed an abutment 20 of the objective means 21, suitable spring means 22, one end of which is attached to the tube 14 and the other end of which is attached to the objective means 21, being provided for this purpose.

The position of the pins 19 is so selected that they are nearer to the end carrying the roller 16 than to the end through which the axle 15 passes. In this way, the objective means 21 will be displaced a distance greater than one half the thickness of the slide 18, for the reasons explained above. Similarly, the ratio of the distance between the intermediate point of the levers at which the pin 19 is carried and the end of the levers at which they are pivotally mounted on the axle 15, to the entire length of the levers 13 is selected as a function of the index of refraction of the type of glass customarily used in slides, so that the transparency of the slide 18 will lie in the focal plane of the objective means 21.

It will be understood that the present invention is susceptible to modification in order to adapt it to different usages and conditions, and, accordingly, it is desired to comprehend such modifications within this invention as may fall within the scope of the appended claims.

What is claimed is:

1. In a self-focussing slide projector, the combination of a support; objective means arranged on said support; a slide carrier arranged on said support in alignment with the optical axis of said objective means and being movable in the direction of said optical axis, said slide carrier having an abutment surface which lies in a plane transverse to said optical axis, said slide carrier being adapted to carry a slide while one side of the latter lies against said abutment surface; and feeler means adapted to engage the opposite side of a slide carried by said slide carrier and being operatively connected to said slide carrier for moving the same in said direction to adjust the distance between said slide carrier and said objective means an amount unequal to but dependent upon the thickness of the slide, said feeler means comprising lever means having lever arms of unequal lengths, one of said lever arms abutting said slide carrier and the other of said lever arms abutting said other side of the slide.

2. The combination defined in claim 1 further comprising spring means resiliently pressing said lever arms into engagement with said slide carrier and said opposite side of the slide.

3. The combination defined in claim 1 wherein said lever means comprise four levers one arm of each of which engages the slide in the region of one of its corners.

4. The combination defined in claim 3 further comprising a pair of guides each of which is connected to two of the arms of said levers which engage the slide so that said arms engage the slide through the intermediary of said guides.

5. The combination defined in claim 4 wherein said guides are pivotally mounted on said arms of said levers.

6. The combination defined in claim 1 wherein said slide carrier is adapted to carry a slide composed of a picture sandwiched between two layers of glass, and wherein the ratio of the lengths of said lever arms is a function of the index of refraction of that layer of glass which is on the objective side.

7. The combination defined in claim 6 wherein said lever means are double-armed and are mounted on said support for pivotal movement relative thereto, wherein the lever arm of greater length abuts against said slide carrier, and wherein the lever arm of shorter length abuts against said other side of said slide.

8. The combination defined in claim 7 wherein the pivot axis of said lever means is spaced from the line joining the point of contact between said lever arm of greater length and said slide carrier and the point of contact between said lever arm of shorter length and said other side of said slide.

9. The combination defined in claim 8 wherein said pivot axis is spaced from said line in the direction of said slide carrier.

References Cited in the file of this patent

UNITED STATES PATENTS

| | | |
|---|---|---|
| 2,008,020 | Jackman | July 16, 1935 |
| 2,298,413 | Reid | Oct. 13, 1942 |
| 2,705,438 | Peto | Apr. 5, 1955 |